United States Patent
Pitcher

(10) Patent No.: US 9,686,653 B2
(45) Date of Patent: Jun. 20, 2017

(54) PREDICTIVE DIRECTIONAL ANTENNA TARGETING

(71) Applicant: Sikorsky Aircraft Corporation, Stratford, CT (US)

(72) Inventor: Garrett Pitcher, Cheshire, CT (US)

(73) Assignee: SIKORSKY AIRCRAFT CORPORATION, Stratford, CT (US)

(*) Notice: Subject to any disclaimer, the term of this patent is extended or adjusted under 35 U.S.C. 154(b) by 0 days.

(21) Appl. No.: 15/057,523

(22) Filed: Mar. 1, 2016

(65) Prior Publication Data

US 2016/0261989 A1 Sep. 8, 2016

Related U.S. Application Data

(60) Provisional application No. 62/126,787, filed on Mar. 2, 2015.

(51) Int. Cl.
| | | |
|---|---|---|
| *H04W 24/00* | (2009.01) | |
| *H04W 4/02* | (2009.01) | |
| *G01S 3/74* | (2006.01) | |
| *G01S 3/785* | (2006.01) | |
| *G01S 5/02* | (2010.01) | |

(52) U.S. Cl.
CPC ............ *H04W 4/028* (2013.01); *G01S 3/74* (2013.01); *G01S 3/785* (2013.01); *G01S 5/02* (2013.01)

(58) Field of Classification Search
CPC .......... H04W 4/028; G01S 3/74; G01S 3/785; G01S 5/02

USPC ......... 455/456.1, 456.5, 456.3; 342/417, 422
See application file for complete search history.

(56) References Cited

U.S. PATENT DOCUMENTS

| | | | |
|---|---|---|---|
| 3,919,529 A | 11/1975 | Baker et al. | |
| 7,561,101 B1* | 7/2009 | Tester | G01S 5/0027 342/357.77 |
| 7,933,599 B2 | 4/2011 | Fernandez-Corbaton et al. | |
| 7,999,726 B2* | 8/2011 | Guertin | H01Q 1/125 244/3.1 |
| 9,110,170 B1* | 8/2015 | Woollard | G01S 13/86 |
| 9,383,753 B1* | 7/2016 | Templeton | G05D 1/0246 |
| 2006/0217127 A1* | 9/2006 | Drane | G01C 21/362 455/456.1 |
| 2008/0146246 A1* | 6/2008 | Bornholdt | G01S 5/0273 455/456.1 |

(Continued)

*Primary Examiner* — Khai M Nguyen
(74) *Attorney, Agent, or Firm* — Cantor Colburn LLP

(57) ABSTRACT

A method of predictive targeting of a directional antenna is provided. The method includes receiving a plurality of state information at a directional antenna control system from a mobile communication node, where the state information includes a position and a trajectory of the mobile communication node. The directional antenna control system logs the state information as a last known position and a last known trajectory of the mobile communication node. An estimated future position of the mobile communication node is determined based on the last known position, the last known trajectory, and a time period. Based on a loss of communication between the directional antenna and the mobile communication node, the directional antenna control system positions the directional antenna to establish a line-of-sight between the directional antenna and the estimated future position of the mobile communication node.

15 Claims, 4 Drawing Sheets

(56) References Cited

U.S. PATENT DOCUMENTS

| | | | |
|---|---|---|---|
| 2010/0330926 A1* | 12/2010 | Monk | H04B 7/18506 455/67.15 |
| 2012/0299763 A1 | 11/2012 | Ryan et al. | |
| 2014/0099978 A1* | 4/2014 | Egner | H04W 4/028 455/456.6 |
| 2014/0218239 A1* | 8/2014 | Sharawi | G01S 3/38 342/422 |
| 2015/0236778 A1* | 8/2015 | Jalali | H04W 84/06 370/316 |

* cited by examiner

PREDICTIVE DIRECTIONAL ANTENNA TARGETING

CROSS-REFERENCE TO RELATED APPLICATIONS

This application claims priority to provisional U.S. patent application Ser. No. 62/126,787, filed Mar. 2, 2015, the disclosure of which is incorporated by reference herein in its entirety.

BACKGROUND OF THE INVENTION

The subject matter disclosed herein generally relates to communication systems, and more particularly to predictive directional antenna targeting of an unmanned aerial vehicle.

Communication systems that include a mobile communication node can experience reduced performance and/or signal loss as the mobile communication node changes position. Tracking antenna systems typically require that physical endpoints continuously transmit their position in order to accurately reposition antennas. When directional antennas are used to communicate with a mobile communication node, a clear line of sight is typically needed for uninterrupted communication. When communication is interrupted, tracking information is lost, making it difficult to reestablish communication while the mobile communication node is in motion. When the mobile communication node is an unmanned aerial vehicle (UAV), a reduction or loss of communication can impede decision-making and planning capabilities. Areas of heavy terrain or urban canyons present a number of challenges to maintain and re-establish line-of-sight communication.

BRIEF DESCRIPTION OF THE INVENTION

According to an aspect of the invention, a method of predictive targeting of a directional antenna is provided. The method includes receiving a plurality of state information at a directional antenna control system from a mobile communication node, where the state information includes a position and a trajectory of the mobile communication node. The directional antenna control system logs the state information as a last known position and a last known trajectory of the mobile communication node. An estimated future position of the mobile communication node is determined based on the last known position, the last known trajectory, and a time period. Based on a loss of communication between the directional antenna and the mobile communication node, the directional antenna control system positions the directional antenna to establish a line-of-sight between the directional antenna and the estimated future position of the mobile communication node.

In addition to one or more of the features described above or below, or as an alternative, further embodiments could include where the state information includes a timestamp associated with the last known position and the last known trajectory of the mobile communication node, and the time period is determined relative to the timestamp and an estimated time to reposition the directional antenna.

In addition to one or more of the features described above or below, or as an alternative, further embodiments could include receiving a current path plan of the mobile communication node as a received current path plan, where the estimated future position of the mobile communication node is further determined based on the received current path plan.

In addition to one or more of the features described above or below, or as an alternative, further embodiments could include identifying two or more possible paths of the mobile communication node, where one of the two or more possible paths is based on the received current path plan. A most likely path of the mobile communication node can be determined based on the state information and the two or more possible paths, and the estimated future position can be determined based on the most likely path.

In addition to one or more of the features described above or below, or as an alternative, further embodiments could include where at least one of the two or more possible paths is an alternate path plan received from the mobile communication node.

In addition to one or more of the features described above or below, or as an alternative, further embodiments could include analyzing a terrain map defining one or more obstructions proximate to the mobile communication node, analyzing a plurality of mission parameters defining navigation priorities of the mobile communication node, and creating an ordered list of path probabilities including the two or more possible paths based on the mission parameters and the terrain map.

In addition to one or more of the features described above or below, or as an alternative, further embodiments could include where the estimated future position is selected based on the terrain map to establish the line-of-sight between the directional antenna and the estimated future position of the mobile communication node with respect to the one or more obstructions.

In addition to one or more of the features described above or below, or as an alternative, further embodiments could include where the directional antenna control system applies a same selection process to determine the most likely path as applied by the mobile communication node in selecting the current path plan.

In addition to one or more of the features described above or below, or as an alternative, further embodiments could include performing a heuristic search for the mobile communication node using the ordered list of path probabilities to define alternate estimated future positions of the mobile communication node based on a failure to establish communication between the directional antenna and the mobile communication node at the estimated future position.

In addition to one or more of the features described above or below, or as an alternative, further embodiments could include where the mobile communication node is an unmanned aerial vehicle.

According to further aspects of the invention, a directional antenna control system for a directional antenna is provided. The directional antenna control system includes a processor and memory having instructions stored thereon that, when executed by the processor, cause the directional antenna control system to receive a plurality of state information from a mobile communication node, the state information including a position and a trajectory of the mobile communication node. The state information is logged as a last known position and a last known trajectory of the mobile communication node. An estimated future position of the mobile communication node is determined based on the last known position, the last known trajectory, and a time period. The directional antenna is positioned to establish a line-of-sight between the directional antenna and the estimated future position of the mobile communication node based on a loss of communication between the directional antenna and the mobile communication node.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

In exemplary embodiments, predictive directional antenna targeting is performed by a directional antenna control system to target a mobile communication node. The mobile communication node is a mobile apparatus that establishes communication with a directional antenna, where the directional antenna may be mobile or stationary in location. The directional antenna can establish a unidirectional or bidirectional line-of-sight communication link with a control system of the mobile communication node. The mobile communication node may be embodied in air, ground, or underwater vehicles, and/or other portable communication systems. In one embodiment, the mobile communication node is an unmanned aerial vehicle (UAV), and the directional antenna control system is part of a ground station that tracks and communicates with the UAV.

Figure 1:
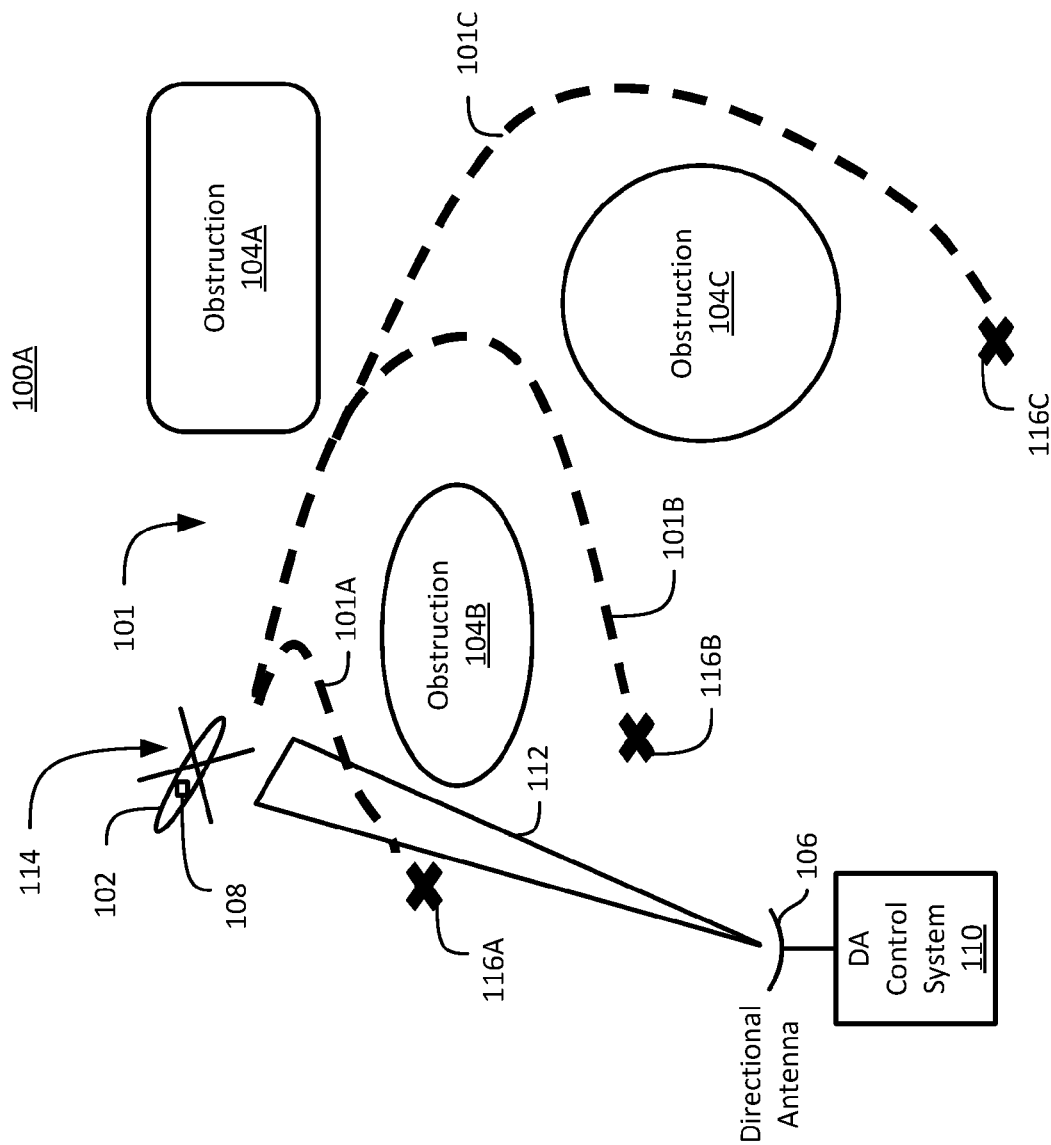
FIG. 1 schematically depicts a number of possible paths for a mobile communication node in accordance with an embodiment.

FIG. 1 schematically depicts a plurality of path plans 101 of a mobile communication node 102 in accordance with an embodiment in a first configuration 100. The path plans 101 define a number of options for navigating around obstructions 104A, 104B, and 104C. Although only three obstructions 104A-104C are depicted in FIG. 1, it will be understood that any number of obstructions may be present that can impede navigation of the mobile communication node 102 and line-of-sight communication with respect to a directional antenna 106. The obstructions 104A-104C can include any physical objects, such as terrain or man-made objects. A mobile communication node control system 108 of the mobile communication node 102 can access and/or update a terrain map of the obstructions 104A-104C based on sensor data and/or historical data that identifies locations and boundaries of the obstructions 104A-104C. The mobile communication node control system 108 may provide the terrain map or a portion thereof to a directional antenna control system 110 that controls positioning of the directional antenna 106. Alternatively, the directional antenna control system 110 can acquire locations and boundaries of the obstructions 104A-104C from one or more other sources, e.g., a preloaded or dynamically constructed map.

In the example of FIG. 1, the directional antenna 106 establishes a line-of-sight 112 to communicate with the mobile communication node 102 while the mobile communication node 102 is at a first position 114. As the mobile communication node 102 advances along one of the path plans 101, the line-of-sight 112 between the directional antenna 106 and the mobile communication node 102 is interrupted by the obstruction 104B and/or obstructions 104C. The mobile communication node control system 108 transmits a plurality of state information to the directional antenna control system 110, such as a position (i.e., the first position 114) and a trajectory (e.g., direction and velocity) of the mobile communication node 102. The directional antenna control system 110 can use the state information to determine an estimated future position of the mobile communication node 102, such as estimated future position 116A along path plan 101A, estimated future position 116B along path plan 101B, and estimated future position 116C along path plan 101C.

Figure 2:
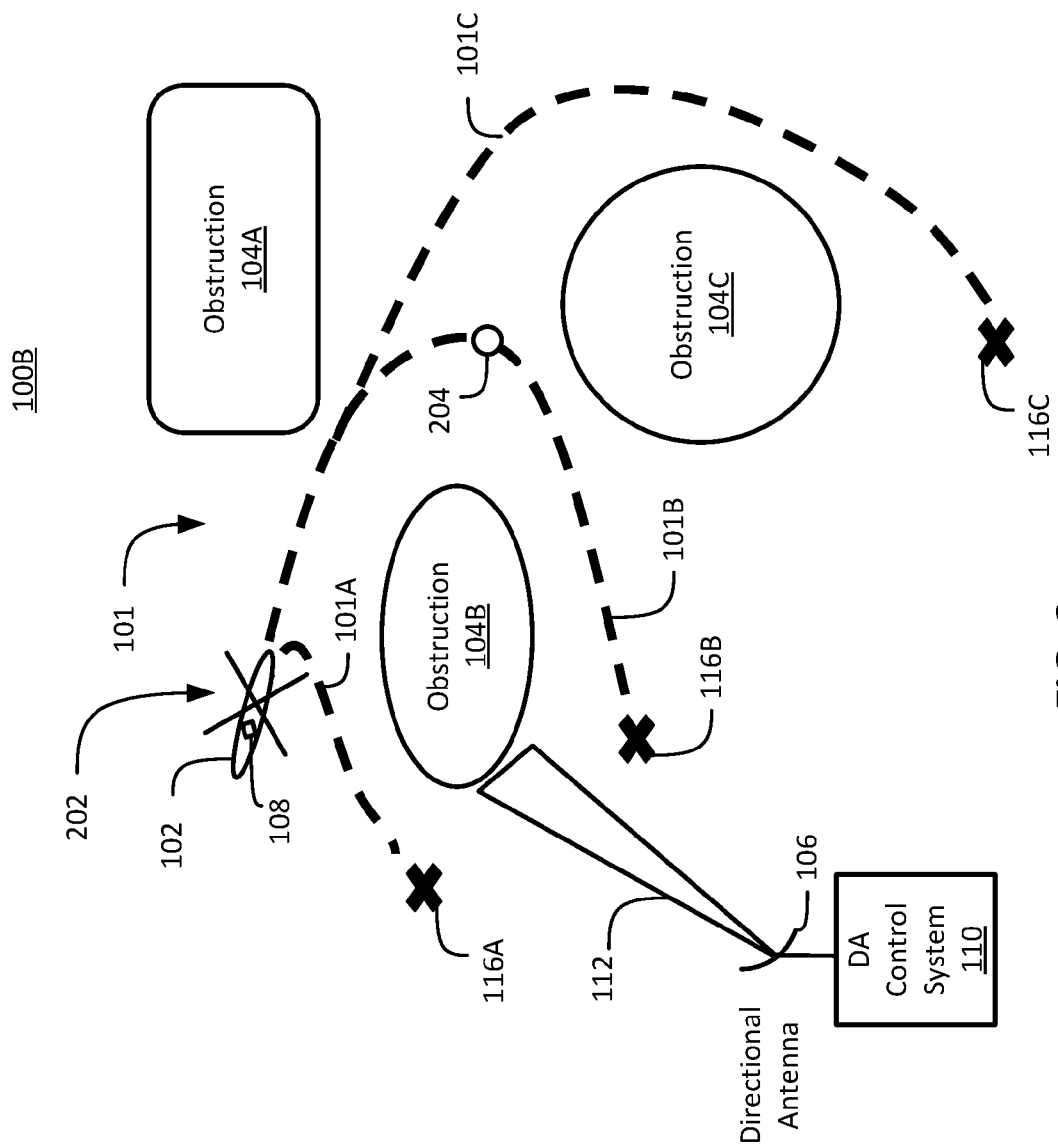
FIG. 2 schematically depicts an obstruction blocking line-of-sight communication with the mobile communication node of FIG. 1 in accordance with an embodiment.

FIG. 2 depicts a second configuration 100B, where the mobile communication node 102 has advanced to a second position 202 that results in a loss of communication between the directional antenna 106 and the mobile communication node 102 due to the obstruction 104B. Rather than randomly searching for the mobile communication node 102, the directional antenna control system 110 can determine an estimated future position of the mobile communication node 102 based on the last known position, the last known trajectory, and a time period since the last known position and the last known trajectory were determined. In one embodiment, the mobile communication node control system 108 provides an indication of a current path plan of the mobile communication node 102 when sending state information to the directional antenna control system 110. For example, path plan 101A may be identified as the current path plan prior to losing communication. Alternatively, path plan 101B can be determined as the current path plan prior to losing communication. To select a position along a path plan as an estimated future position, the directional antenna control system 110 may also account for an estimated time required to reposition the directional antenna 106. For example, even though the line-of-sight 112 may be adjusted to target a location 204 along path plan 101B, the directional antenna control system 110 may instead select estimated future position 116B along path plan 101B, which is further along the path plan 101B to account for progress made by the mobile communication node 102 between when communication was lost and to provide greater computational and position change time margin for the directional antenna 106.

Figure 3:
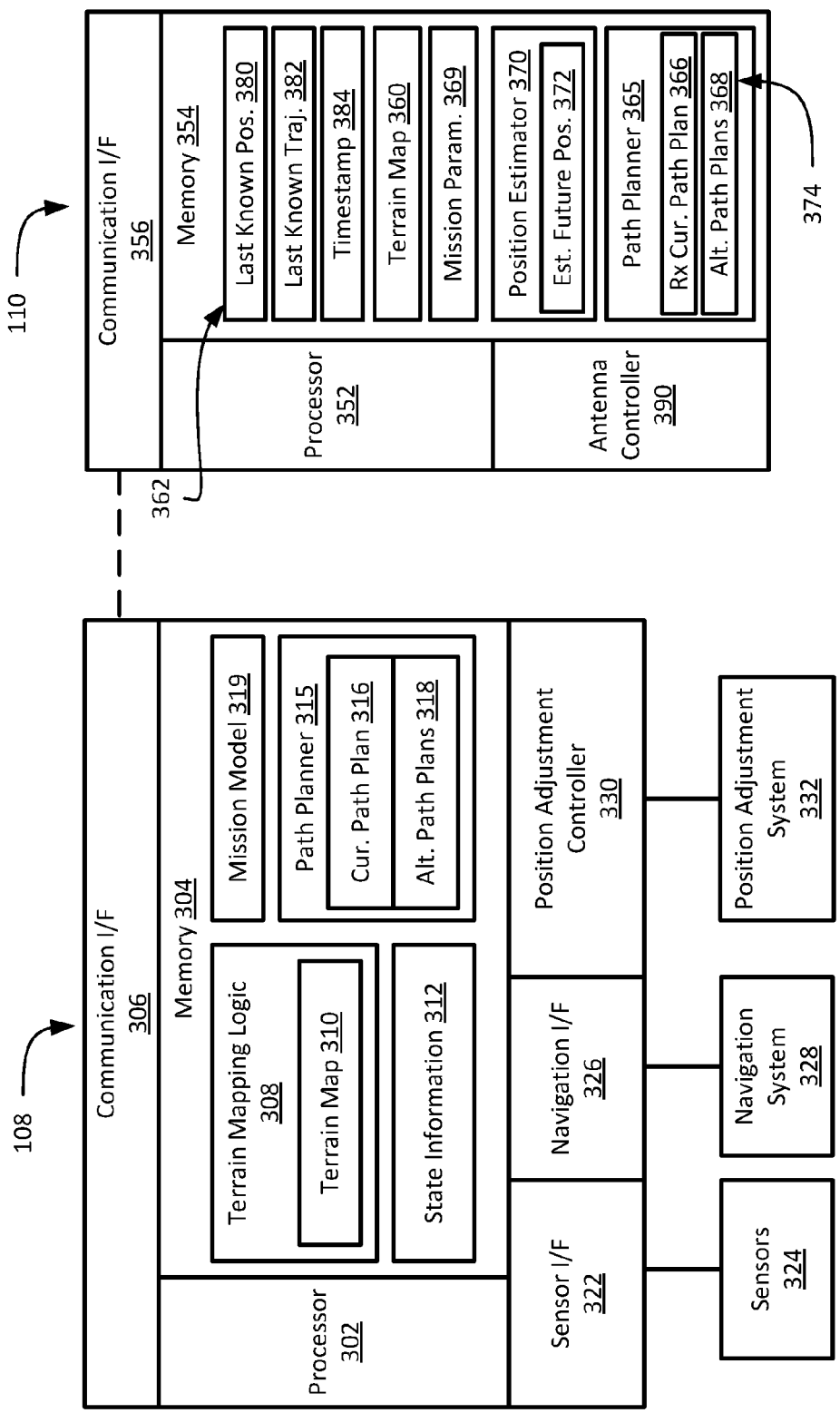
FIG. 3 schematically depicts a block diagram of a mobile communication node control system and a directional antenna control system in accordance with embodiments.

In order to handle situations where multiple estimated future positions 116 are possible, such as the example of FIGS. 1 and 2, the directional antenna control system 110 determines a most likely path of the mobile communication node 102 based on last received state information and information about the two or more possible paths, as further described in reference to FIG. 3. FIG. 3 schematically depicts a block diagram of the mobile communication node control system 108 and the directional antenna control system 110 of FIGS. 1 and 2 in accordance with embodiments.

In the example of FIG. 3, the mobile communication node control system 108 includes a processor 302, memory 304, and a communication interface 306. The processor 302 can be any type or combination of computer processors, such as a microprocessor, microcontroller, digital signal processor, application specific integrated circuit, programmable logic device, and/or field programmable gate array. The memory 304 is an example of a non-transitory computer readable storage medium tangibly embodied in the mobile communication node control system 108 including executable instructions stored therein, for instance, as firmware. Examples of instructions that can be stored in the memory 304 for execution by the processor 302 include terrain mapping logic 308 and a path planner 315.

The terrain mapping logic 308 can generate a terrain map 310 that may be defined in three-dimensional space to identify locations and boundaries of obstructions, such as the obstructions 104A-104C of FIGS. 1 and 2. A sensor interface 322 of the mobile communication node control system 108 can acquire sensor data from sensors 324 to populate and/or update the terrain map 310. Examples of the sensors 324 can include perception sensors such as one or more video cameras, LIght Detection and Ranging scanners (LIDAR), LAser Detection and Ranging scanners (LADAR), RAdio Detection And Ranging (RADAR), and other sensor types known in the art. Position information for the terrain mapping logic 308 and the path planner 315 can be acquired from a navigation system 328 via a navigation interface 326. The navigation interface 326 can receive location data defining a position and trajectory from the navigation system 328, such as an inertial measurement unit (IMU), global positioning system (GPS), or the like. State information 312, such as position and trajectory, can also be stored in the memory 304 along with the terrain map 310 and a mission model 319. Timestamps may be stored with data in the memory 304, such as the state information 312, to indicate when the values (e.g., position and trajectory) were determined.

The path planner 315 may access the terrain map 310, the state information 312, and the mission model 319 to determine a current path plan 316 and one or more alternate path plans 318. The current path plan 316 and alternate path plans 318 can define starting locations, target locations, and expected paths of travel with velocity/timing information between locations. Paths of travel can be defined in three dimensions, including altitude or depth for airborne or submersible instances of the mobile communication node 102 of FIGS. 1 and 2. The path planner 315 can update the current path plan 316 and the alternate path plans 318 based on changing conditions and constraints defined in the mission model 319. For instance, upon discovering a previously unknown obstruction, the current path plan 316 and the alternate path plans 318 may be recomputed to avoid the newly discovered obstruction. As another example, if fuel level drops below a threshold level, one of the alternate path plans 318 that is optimized for fuel consumption may be swapped with the current path plan 316, where the current path plan 316 may be optimized for minimum travel time at a higher velocity.

The mobile communication node control system 108 can also include a position adjustment controller 330 to interface with a position adjustment system 332 of the mobile communication node 102 of FIGS. 1 and 2. The position adjustment controller 330 can command movements of the mobile communication node 102 using the position adjustment system 332, which may include engine controls, steering controls, flight controls and the like. When implemented as an autonomous system, the position adjustment controller 330 uses the current path plan 316 to guide the position adjustment system 332 to follow the current path plan 316.

The directional antenna control system 110 includes a communication interface 356 operable to communicate with the communication interface 306 of the mobile communication node control system 108 when a line-of-sight (e.g., line-of-sight 112 of FIG. 1) exists between the mobile communication node 102 and the directional antenna control system 110. Similar to the mobile communication node control system 108, the directional antenna control system 110 includes a processor 352, memory 354, and the communication interface 356. The processor 352 can be any type or combination of computer processors, such as a microprocessor, microcontroller, digital signal processor, application specific integrated circuit, programmable logic device, and/or field programmable gate array. The memory 354 is an example of a non-transitory computer readable storage medium tangibly embodied in the directional antenna control system 110 including executable instructions stored therein, for instance, as firmware. Examples of instructions that can be stored in the memory 354 for execution by the processor 352 include a path planner 365 and a position estimator 370.

The memory 354 can also include a terrain map 360 which may represent a portion of the terrain map 310 received from the mobile communication node control system 108. The terrain map 360 can be limited to cover a geographic region reachable by the directional antenna 106 of FIGS. 1 and 2, while the terrain map 310 may cover a larger geographic area. Accordingly, terrain map 360 may identify locations and boundaries of obstructions 104A-104C of FIGS. 1 and 2, or may only cover obstructions 104B and 104C if obstruction 104A is out of range for consideration in this example.

State information 312 of the mobile communication node 102 may include a position and a trajectory of the mobile communication node, which are logged in state information 362 as a last known position 380 and a last known trajectory 382 of the mobile communication node 102 when received at the directional antenna control system 110. The state information further 362 can also include a timestamp 384 associated with the last known position 380 and the last known trajectory 382 of the mobile communication node 102. Mission parameters 369 can be extracted and sent from the mission model 319 and stored in the memory 354 to define general constraints of the mobile communication node 102 and geographic constraints as bounded by the terrain map 360 that define navigation priorities of the mobile communication node 102. For example, the mission parameters 369 may define a minimum safe distance to maintain relative to obstructions.

The path planner 365 may receive one or more of the current path plan 316 and the alternate path plans 318 from the path planner 315. Alternatively, the path planner 365 may only receive the current path plan 316 as a received current path plan 366 and derive one or more alternate path plans 368 using the same process that the path planner 315 uses to determine the alternate path plans 318. For instance, the received current path plan 366 can serve as a baseline path plan where the terrain map 360, state information 362, and mission parameters 369 may be used to derive the alternate path plans 368 with respect to obstructions, optimization targets, the last known position 380, and the last known trajectory 382.

The position estimator 370 determines one or more estimated future positions 372 of the mobile communication node 102 along the received current path plan 366 and/or one or more of the alternate path plans 368. For example, timing information from the timestamp 384 along with the last known position 380 and the last known trajectory 382 of the mobile communication node 102 can be used to estimate when the mobile communication node 102 will reach a particular position. The position estimator 370 can check the terrain map 360 to eliminate considering locations that would be blocked from line-of-sight communication based on one or more obstructions. The position estimator 370 may further determine a time period when the directional antenna control system 110 can establish a line-of-sight between the directional antenna 106 and the estimated future position 372 of the mobile communication node 102 relative to the timestamp 384 and an estimated time to reposition the directional antenna 106 by antenna controller 390. Based on a loss of communication between the directional antenna 106 and the mobile communication node 102, the antenna controller 390 positions the directional antenna 106 to establish a line-of-sight between the directional antenna 106 and the estimated future position 372.

The received current path plan 366 and the alternate path plans 368 are used to identify two or more possible paths 374 of the mobile communication node 102. The path planner 365 can determine a most likely path of the mobile communication node 102 based on the state information 362 and the two or more possible paths 374. The path planner 365 may determine the most likely path of the mobile communication node 102 by analyzing the terrain map 360 to identify one or more obstructions proximate to the last known position 380 of the mobile communication node 102. The path planner can also analyze the mission parameters 369 for navigation priorities of the mobile communication node 102. The path planner 365 may create an ordered list of path probabilities including the two or more possible paths 374 based on the mission parameters 369 and the terrain map 360. The highest probability path becomes the current path plan and the lower probability paths become alternate path plans following the same process used by the mobile communication node control system 108 to determine the current path plan 316 and the alternate path plans 318 as a most likely path and less likely paths.

The position estimator 370 determines the estimated future position 372 based on the most likely path, which may be the received current path plan 366 or one of the alternate path plans 368 as determined by the path planner 365. The estimated future position 372 may be selected based on the terrain map 360 to establish a line-of-sight between the directional antenna 106 and the estimated future position 372 of the mobile communication node 102 with respect to one or more obstructions.

With respect to FIGS. 1-3, based on a failure to establish communication between the directional antenna 106 and the mobile communication node 102 at the estimated future position 372, the directional antenna control system 110 can perform a heuristic search for the mobile communication node 102 using the ordered list of path probabilities to define alternate estimated future positions of the mobile communication node 102. For example, if path plan 101A is the most likely path and communication cannot be established at an expected time at estimated future position 116A, the directional antenna control system 110 may first search along path plan 101A and then switch to the next highest probability path plan, such as path plan 101B for searching around estimated future position 116B and along path plan 101B. If communication is still not established, the directional antenna control system 110 may next search at estimated future position 116C and along path plan 101C as a lowest probability path.

Figure 4:
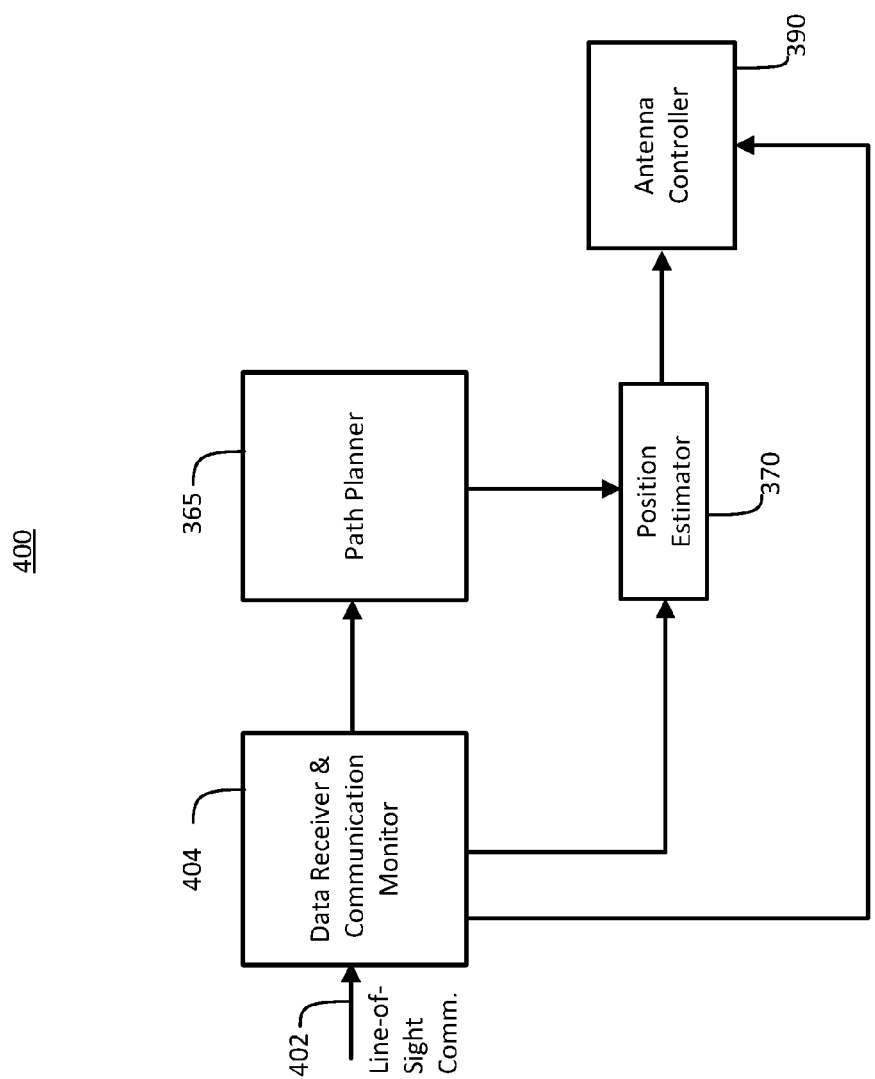
FIG. 4 schematically depicts a block diagram of a data flow for predictive directional antenna targeting in accordance with embodiments.

FIG. 4 schematically depicts a block diagram of a data flow 400 of the directional antenna control system 110 of FIGS. 1-3 in accordance with embodiments. In the data flow 400, line-of-sight communication 402 is provided to a data receiver and communication monitor 404 from the mobile communication node control system 108 of FIGS. 1-3. Data received at the data receiver and communication monitor 404 are provided to the path planner 365 and position estimator 370. The path planner 365 also provides path plan data to the position estimator 370. Based on the data receiver and communication monitor 404 detecting a loss of the line-of-sight communication 402, the antenna controller 390 uses an output of the position estimator 370 to position the directional antenna 106 of FIGS. 1 and 2 to establish a line-of-sight between the directional antenna 106 and the estimated future position 372 of the mobile communication node 102.

Technical effects include providing predictive targeting of a directional antenna based on state information received at a directional antenna control system from a mobile communication node to re-establish line-of-sight communication between the directional antenna and the mobile communication node after a loss of communication.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of predictive targeting of a directional antenna, the method comprising:
   receiving a plurality of state information at a directional antenna control system from a mobile communication node, the state information comprising a position and a trajectory of the mobile communication node;
   logging the state information, by the directional antenna control system, as a last known position and a last known trajectory of the mobile communication node;
   determining an estimated future position of the mobile communication node based on the last known position, the last known trajectory, and a time period;
   based on a loss of communication between the directional antenna and the mobile communication node, positioning the directional antenna by the directional antenna control system to establish a line-of-sight between the directional antenna and the estimated future position of the mobile communication node.

2. The method of claim 1, wherein the state information further comprises a timestamp associated with the last known position and the last known trajectory of the mobile communication node, and the time period is determined relative to the timestamp and an estimated time to reposition the directional antenna.

3. The method of claim 1, further comprising:
   receiving a current path plan of the mobile communication node as a received current path plan, wherein the estimated future position of the mobile communication node is further determined based on the received current path plan.

4. The method of claim 3, further comprising:
identifying two or more possible paths of the mobile communication node, wherein one of the two or more possible paths is based on the received current path plan;
determining a path of the mobile communication node based on the state information and the two or more possible paths; and
determining the estimated future position based on the path.

5. The method of claim 4, wherein at least one of the two or more possible paths is an alternate path plan received from the mobile communication node.

6. The method of claims 4, wherein determining the path of the mobile communication node further comprises:
analyzing a terrain map defining one or more obstructions proximate to the mobile communication node;
analyzing a plurality of mission parameters defining navigation priorities of the mobile communication node; and
creating an ordered list of path probabilities including the two or more possible paths based on the mission parameters and the terrain map.

7. The method of claim 6, wherein the estimated future position is selected based on the terrain map to establish the line-of-sight between the directional antenna and the estimated future position of the mobile communication node with respect to the one or more obstructions.

8. The method of claims 4, wherein the directional antenna control system applies a same selection process to determine the path as applied by the mobile communication node in selecting the current path plan.

9. The method of claims 6, further comprising:
based on a failure to establish communication between the directional antenna and the mobile communication node at the estimated future position, performing a heuristic search for the mobile communication node using the ordered list of path probabilities to define alternate estimated future positions of the mobile communication node.

10. The method of claims 1, wherein the mobile communication node is an unmanned aerial vehicle.

11. A directional antenna control system for a directional antenna, the directional antenna control system comprising:
a processor; and
memory having instructions stored thereon that, when executed by the processor, cause the directional antenna control system to:
receive a plurality of state information from a mobile communication node, the state information comprising a position and a trajectory of the mobile communication node;
log the state information as a last known position and a last known trajectory of the mobile communication node;
determine an estimated future position of the mobile communication node based on the last known position, the last known trajectory, and a time period;
based on a loss of communication between the directional antenna and the mobile communication node, positioning the directional antenna to establish a line-of-sight between the directional antenna and the estimated future position of the mobile communication node.

12. The directional antenna control system of claim 11, wherein the state information further comprises a timestamp associated with the last known position and the last known trajectory of the mobile communication node, and the time period is determined relative to the timestamp and an estimated time to reposition the directional antenna.

13. The directional antenna control system of claims 11, wherein the instructions further cause the directional antenna control system to:
receive a current path plan of the mobile communication node as a received current path plan, wherein the estimated future position of the mobile communication node is further determined based on the received current path plan.

14. The directional antenna control system of claim 13, wherein the instructions further cause the directional antenna control system to:
identify two or more possible paths of the mobile communication node, wherein one of the two or more possible paths is based on the received current path plan;
selecting one of the two or more possible paths as an expected path of the mobile communication node based on the state information and the two or more possible paths; and
determine the estimated future position based on the expected path.

15. The directional antenna control system of claim 14, wherein the instructions further cause the directional antenna control system to:
analyze a terrain map defining one or more obstructions proximate to the mobile communication node;
analyze a plurality of mission parameters defining navigation priorities of the mobile communication node; and
create an ordered list of path probabilities including the two or more possible paths based on the mission parameters and the terrain map.

* * * * *